United States Patent [19]

Winkler et al.

[11] 3,968,509

[45] July 6, 1976

[54] FILM ADVANCE AND METERING MECHANISM FOR CAMERAS

[75] Inventors: Alfred Winkler, Munich; Rolf Schröder, Baldham, both of Germany

[73] Assignee: AGFA-Gevaert, A.G., Leverkusen, Germany

[22] Filed: Aug. 30, 1974

[21] Appl. No.: 502,010

[30] Foreign Application Priority Data

Aug. 31, 1973 Germany............................ 2343890

[52] U.S. Cl. ................................................ 354/213
[51] Int. Cl.² ............................................. G03B 1/16
[58] Field of Search ................................... 354/213

[56] References Cited
UNITED STATES PATENTS

| | | | |
|---|---|---|---|
| 3,603,236 | 9/1971 | Engelsmann | 354/213 |
| 3,712,200 | 1/1973 | Beach | 354/213 |
| 3,747,494 | 7/1973 | Peters | 354/213 |
| 3,750,545 | 8/1973 | Beach | 354/213 |
| 3,757,658 | 9/1973 | Stoneham | 354/213 |
| 3,774,513 | 11/1973 | Ettischer | 354/213 |
| 3,776,114 | 12/1973 | Edwards | 354/213 |

*Primary Examiner*—Joseph F. Peters, Jr.
*Attorney, Agent, or Firm*—Michael J. Striker

[57] ABSTRACT

A still camera for use with roll film having a row of perforations, one for each film frame, wherein the film is transported lengthwise by a mechanism including a planetary transmission and the transport of film is terminated in response to disengagement of a pivotable control lever from the teeth of a gear forming part of the film transporting mechanism. The control lever is disengaged from the gear by a spring-biased displacing lever which is normally held against pivotal movement into engagement with the control lever by a blocking lever. The latter can be disengaged from the displacing lever by a feeler which bears against the film and penetrates into an oncoming perforation to disengage the blocking lever from the displacing lever in response to further transport of the film. The displacing lever then pivots the control lever and bears against the feeler while the film is at a standstill. The feeler is retracted from the perforation after the displacing lever is disengaged from the control lever during opening of the shutter whereby the blocking lever is free to return into a position in which it prevents the displacing lever from disengaging the control lever from the gear. The blocking lever then also prevents the displacing lever from bearing against the feeler.

9 Claims, 3 Drawing Figures

3,968,509

FILM ADVANCE AND METERING MECHANISM FOR CAMERAS

CROSS-REFERENCE TO RELATED APPLICATION

The photographic apparatus of the present invention constitutes an improvement over and a further development of photographic apparatus disclosed in the commonly owned copending application Ser. No. 419,728 filed Nov. 28, 1973 by Dieter Engelsmann et al., now U.S. Pat. No. 3,825,939 granted July 23, 1974.

BACKGROUND OF THE INVENTION

The present invention relates to photographic apparatus in general, especially to still cameras, and more particularly to improvements in film transporting mechanisms for still cameras which use photographic roll film having a row of perforations, one for each film frame.

The copending application Ser. No. 419,728 of Engelsmann et al. discloses a still camera wherein the film is transported by a mechanism including a planetary transmission and the transport of film is terminated when a control lever is disengaged from a gear of the planetary transmission. Such disengagement takes place in response to pivoting of a second lever (hereinafter called displacing lever) which is free to strike against the control lever when the scanning arm of a pivotable and reciprocable feeler penetrates into an oncoming perforation of the film. Prior to penetration into an oncoming perforation, the scanning arm of the feeler bears against the front side of the moving film under the action of a relatively weak helical spring as well as under the action of a much stronger torsion spring which biases the displacing lever aginst a lug of the feeler. Such combined bias of the two springs is likely to damage the film, especially in the region of a perforation. The likelihood of damage is particularly pronounced if the scanning arm is to be entrained by moving film subsequent to penetration into an oncoming perforation whereby such entrainment results in disengagement of the displacing lever from the lug of the feeler and in pivoting of the control lever away from the aforementioned gear.

SUMMARY OF THE INVENTION

An object of the invention is to provide a photographic apparatus, particularly a still camera, with novel and improved means for preventing excessive stressing of roll film in the region of perforations.

Another object of the invention is to provide a still camera with novel and improved means for automatically interrupting the transport of film as soon as the film has been advanced by the length of a frame.

A further object of the invention is to provide novel and improved means for maintaining the displacing lever of the still camera out of engagement with the feeler during transport of photographic roll film by the length of a frame.

An additional object of the invention is to provide novel and improved means for freeing the displacing lever in response to completion of film transport by the length of a frame.

The invention is embodied in a photographic apparatus, especially in a still camera, for use with photographic roll film having a row of perforations, one for each film frame. The apparatus comprises means for transporting the film lengthwise along a predetermined path which extends between a supply reel and a takeup reel, control means which is movable from a first position to a second position to thereby terminate or effect a termination of the transport of film along the path (the control means preferably comprises a two-armed lever one arm of which carries a pallet engaging a gear of the film transporting means during transport of the film and being disengaged from the gear in automatic response to completed transport of the film by the length of a frame to thereby prevent the film transporting means from drawing additional film off the core of the supply reel), displacing means which is movable from a first position to a second position to thereby move the control means from the first to second position (the displacing means preferably comprises a second lever which is biased to its second position by a strong spring), blocking means which is movable from a first to a second position in which the blocking means respectively prevents and permits the movement of the displacing means to its second position (the blocking means preferably comprises a third lever which is biased to its first position by a suitable spring), a mobile feeler having a scanning portion in line with the row of perforations of the film in the aforementioned path, and means for biasing the scanning portion against the film in the path so that the scanning portion of the feeler penetrates into an oncoming perforation during transport of the film and the film thereupon moves the feeler from a first to a second position in response to further transport of the film. The feeler has a second portion (e.g., a lobe) which moves the blocking means from the first to the second position not later than when the feeler reaches its second position whereby the blocking means allows the displacing means to move the control means from the first to the second position and to terminate the transport of the film.

The displacing means has a portion (e.g., a surface bounding a notch of the displacing means) which bears against the feeler in the second position of the displacing means so that the means which biases the displacing means to the second position assists the aforementioned biasing means in urging the scanning portion into the adjacent perforation. However, when the blocking means holds the displacing means in the first position, the aforementioned portion of the displacing means cannot bear against the feeler so that the scanning portion is biased against the film exclusively by the relatively weak first mentioned biasing means.

The novel features which are considered as characteristic of the invention are set forth in particular in the appended claims. The improved photographic apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
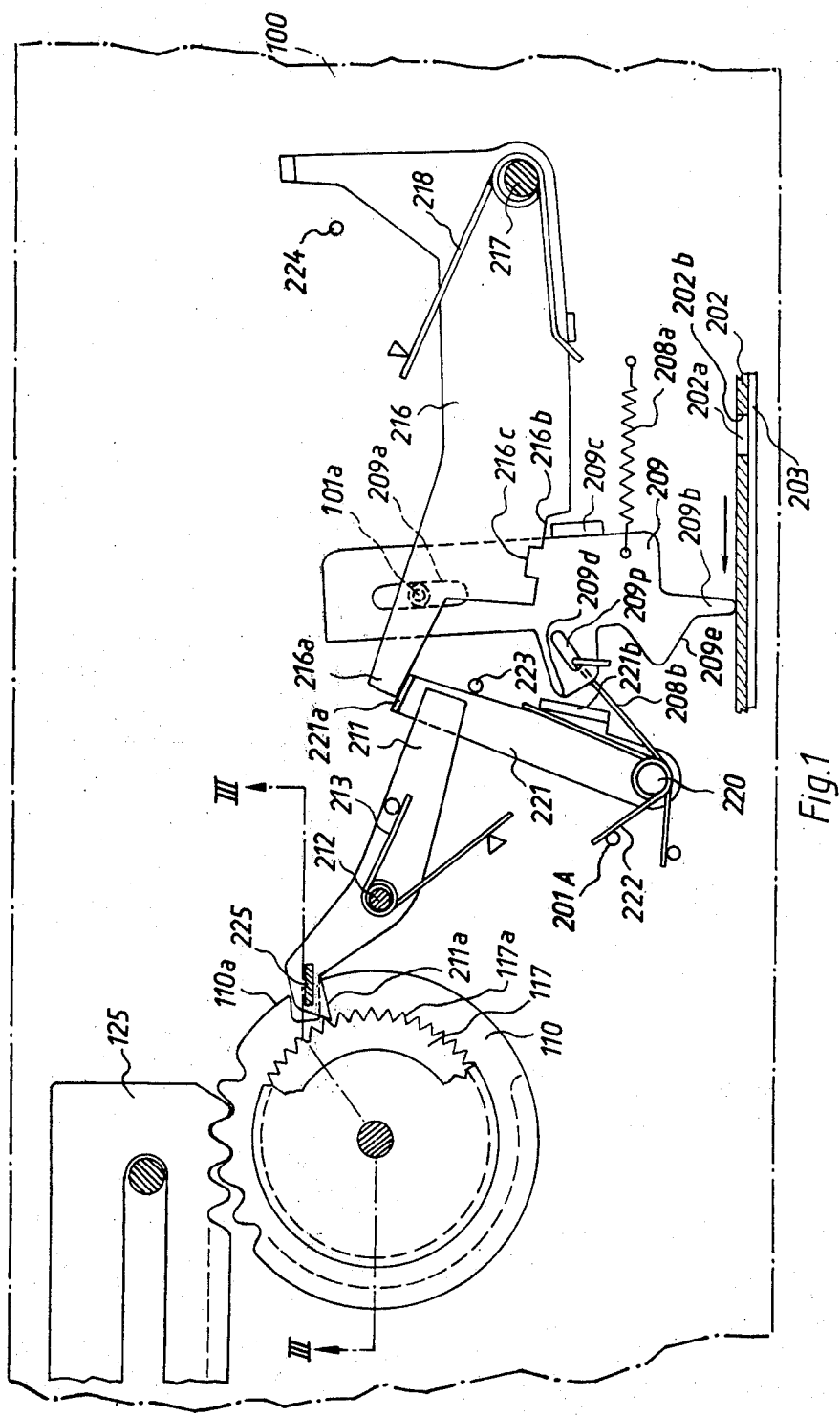
FIG. 1 is an enlarged fragmentary horizontal sectional view of a photographic apparatus which embodies one form of the invention, with the feeler shown without a perforation of the film.
Figure 3:
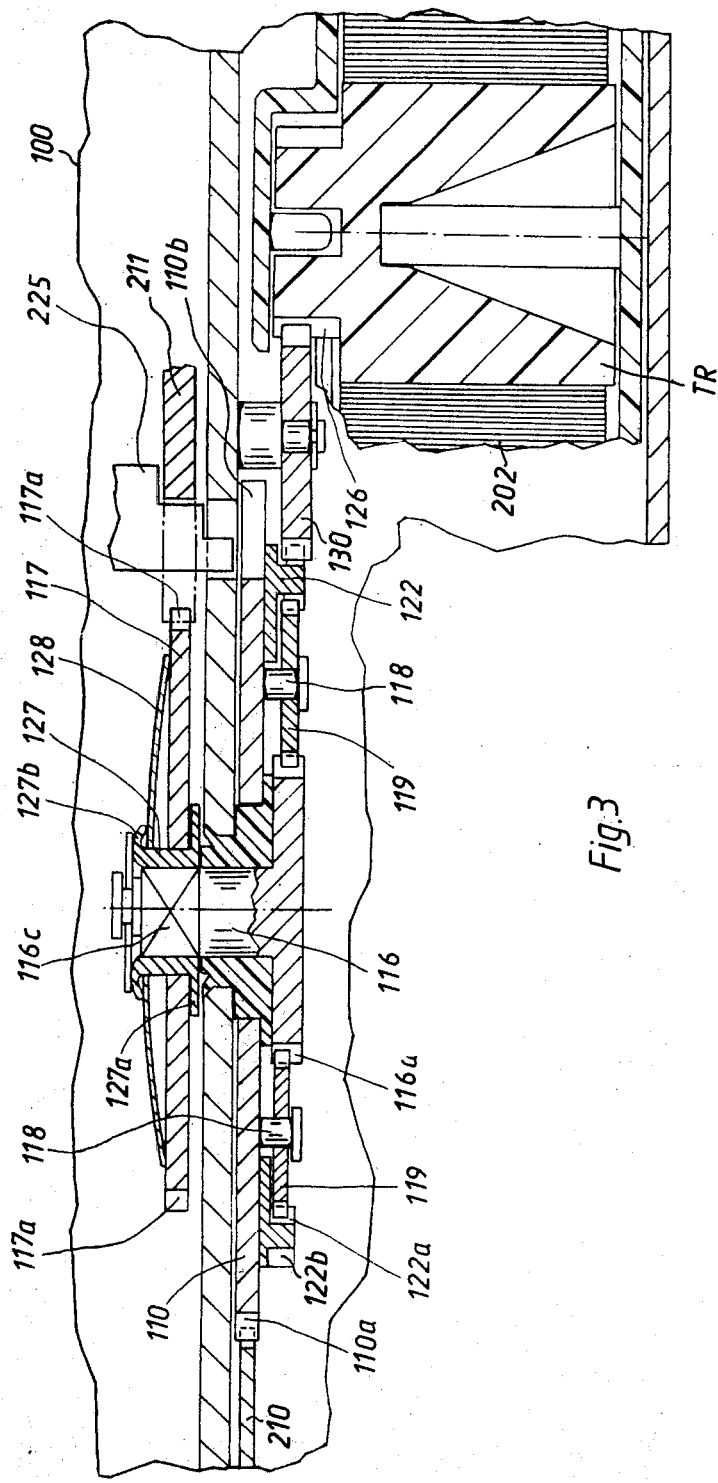
FIG. 3 is an enlarged sectional view as seen in the direction of arrows from the line III—III of FIG. 1.

Referring first to FIGS. 1 and 3, there is shown a portion of a still camera having a housing or body 100 which contains a supply reel (not shown) and a takeup reel TR for photographic roll film 202. The film 202 has a row of perforations 202a, one for each film frame, and can be confined in a suitable cassette (not shown) which further contains a strip of backing paper 203 for the film 202.

The film transporting mechanism of the camera comprises a wheel 110 which is rotatably mounted in the interior of the housing 100 and has an annulus of teeth 110a one of which is normally engaged by the pallet of a retractable arresting pawl 210 serving to hold the wheel 110 against rotation in one direction. The means for rotating the wheel 110 from a starting position which is shown in FIG. 1 to an end position or second position (close to that shown in FIG. 2) and back to the starting position of FIG. 1 comprises a reciprocable actuating member 125 which resembles a toothed rack and a portion of which extends from the housing 100, preferably in a region close to one corner of the housing. If the actuating member 125 is omitted, a portion of the wheel 110 extends from the housing 100 so that it can be engaged and rotated by hand. A return spring 127 (see FIG. 2) is provided to bias the actuating member 125 to the starting position of FIG. 1. The arresting pawl 210 is automatically disengaged from the adjacent tooth 110a when the spring 127 is free to start retracting the actuating member 125 back to the position of FIG. 1. For example, the pawl 210 can be disengaged from the wheel 110 by a control lever 211 when the latter is disengaged from a gear 117.

The wheel 110 is further provided with a peripheral recess or notch 110b which moves along an arc of less than 360° while the wheel 110 is being rotated from the starting position of FIG. 1 to a second or end position or vice versa. The wheel 110 constitutes the planet carrier of a planetary transmission and carries three equally spaced shafts 118 for discrete planet pinions 119. The teeth of the pinions 119 mesh with the teeth 116a of a sun gear 116 and with the internal teeth 122a of an internal gear or ring gear 122. The external teeth 122b of the ring gear 122 mesh with the teeth of an intermediate gear 130 which can rotate a gear 126 on the takeup reel TR in a direction to effect a movement of the film 202 from the supply reel toward the takeup reel.

The parts 110, 125 constitute a composite input means of the transmission, the ring gear 122 is the first output member, and the gear 117 is the second output member which is coaxial with the wheel 110.

The sun gear 116 normally rotates with the gear 117 which is formed with an annulus of teeth 117a engageable by the tooth or pallet 211a of the two-armed control lever 211 which is pivotable on a fixed shaft 212 and is biased against the gear 117 (first position of the lever 211) by a torsion spring 213. The control lever 211 normally maintains its pallet 211a in engagement with the adjacent teeth 117a of the gear 117 as long as the scanning portion or arm 209b of a mobile feeler 209 does not enter the oncoming perforation 202a of the film 202. Shortly after the scanning arm 209b penetrates into the oncoming perforation 202a of the film 202, the control lever 211 is caused to pivot against the opposition of the torsion spring 213 and moves its tooth 211a away from the teeth 117a (second position of the lever 211) so that the gear 117 is free to rotate with the sun gear 116. The scanning arm 209b can be automatically retracted from the adjacent perforation 202a when the user actuates the camera release 225. The arm 209b is retracted before or while the actuating member 125 is moved by hand to advance the film 202 by the length of a frame subsequent to completion of an exposure. The transport of film 202 by the length of a frame is terminated shortly after the scanning arm 209b penetrates into the oncoming perforation 202a; such termination of film transport takes place as soon as the control lever 211 is disengaged from the gear 117 because the gears 116, 117 then offer less resistance to rotation than the ring gear 122, intermediate gear 130, gear 126 and takeup reel TR. This is attributed to tension of the film 202 and also to friction.

The camera further comprises an overload clutch which is interposed between the sun gear 116 and gear 117 and allows the sun gear 116 to rotate relative to the gear 117 when the ring gear 122 cannot rotate while the control lever 211 engages the gear 117. This can happen if the last full film frame is followed by an incomplete film frame so that the wheel 110 could not be rotated all the way to its second position in the absence of some means which would permit the gear 116 and/or 122 of the planetary transmission to rotate while the operator forces the actuating member 125 all the way to its fully depressed position. The absence of an overload clutch between the gears 116, 117 (or between the gear 117 and control lever 211) could result in a tearing of the film 202 and/or in damage to component parts of the camera.

The overload clutch is shown in FIG. 3 and comprises a sleeve 127 which is non-rotatably mounted on a polygonal stub 116c of the shaft of the sun gear 116. The gear 117 is rotatable on the sleeve 127 and abuts against one flange 127a of this sleeve. A second flange 127b of the sleeve 127 serves as a retainer for the median portin of a dished spring 128 whose marginal portion bears against the exposed end face of the gear 117 and biases the other end face of the gear 117 into frictional engagement with the flange 127a. The bias of the spring 128 is selected in such a way that the sun gear 116 is free to rotate relative to the gear 117 if the user of the camera continues to rotate the wheel 110 clockwise, as viewed in FIG. 1 or 2, while the gear 122 is held against rotation and the control lever 211 engages the gear 117, before the film 202 tears and before the parts of the camera are damaged. As mentioned above, this can take place if the last frame of the film 202 is shorter than a normal frame so that the supply reel cannot continue to pay out the film while the wheel 110 is still in the process of moving from the starting position of FIG. 1 to the aforementioned second position. When the sun gear 116 rotates but the gear 117 is held by the control lever 211, the sleeve 127 simply rotates in the central opening of the gear 117 and with respect to the spring 128 (which latter, however, can rotate with the sleeve 127).

The feeler 209 is directly biased by a helical spring 208a and a weak torsion spring 208b, and can be indirectly biased by a strong torsion spring 218. The means for guiding the feeler 209 comprises a fixed guide pin 101a which is secured to the housing 100 and extends into an elongated slot 209a of the feeler. The torsion spring 208b biases the scanning arm 209b against the front side of the film 202 in line with the row of perforations 202a. The spring 208a biases the scanning arm 209b counter to the direction of film transport, i.e., in a direction to the right, as viewed in FIG. 1 or 2. The feeler 209 further comprises a projection 209c which can constitute an integral lug bent through 90° from the general plane of the feeler.

Figure 2:
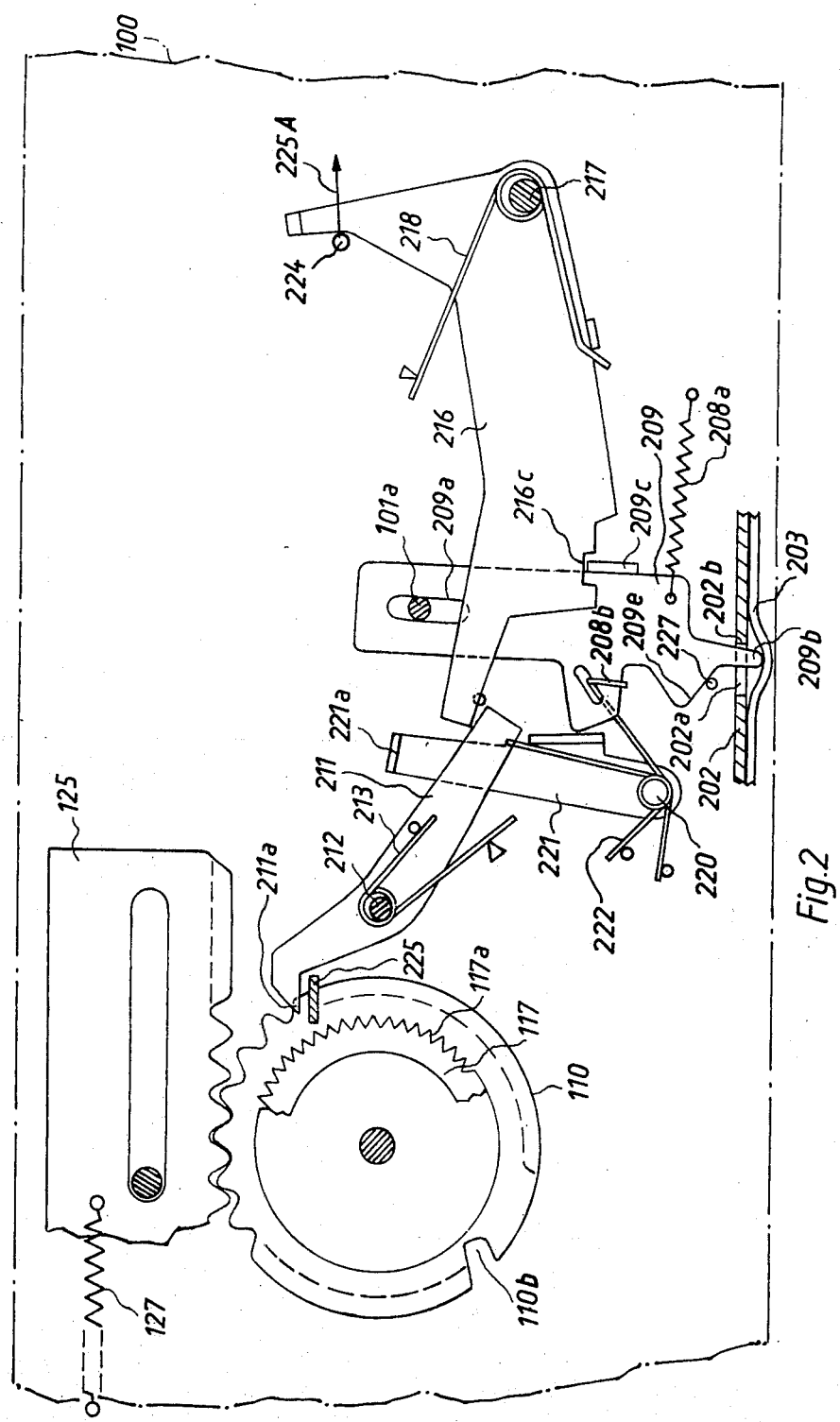
FIG. 2 is a similar sectional view but showing the feeler in an adjacent perforation.

The aforementioned torsion spring 218 can act on the feeler 209 through the medium of a displacing lever 216 which is mounted on a fixed pivot 217 and is biased by the torsion spring 218 in a counterclockwise direction, as viewed in FIG. 1 or 2. That edge face of the lever 216 which faces the front side of the film 202 is formed with a relatively shallow recess or notch 216b and a relatively deep recess or notch 216c. When the scanning arm 209b bears against the front side of the film 202, the projection 209c extends with clearance into the shallower recess 216b (see FIG. 1) whereby the torsion spring 218 is unable to urge the feeler 209 against the film. Thus, when the film 202 is being moved lengthwise, its front side is engaged by the scanning arm 209b which is biased solely by the relatively weak torsion spring 208b. When the scanning arm 209b penetrates into an oncoming perforation 202a (see FIG. 2), the film 202 continues to move in a direction to the left, as viewed in FIG. 1 or 2, because the control lever 211 continues to engage the gear 117, whereby the surface 202b bounding the perforation 202a engages and pivots the feeler 209 in a clockwise direction from a first to a second position to thereby stress the relatively weak helical spring 208a. The tip of the scanning arm 209b bears against the backing paper 203 and the latter is under sufficient tension to prevent excessive penetration of arm 209b into the adjacent perforation 202a.

During forward transport of the film 202, the end portion 216a of the displacing lever 216 abuts against a ledge or platform 211a at the free end of a one-armed blocking lever 211 which is turnably mounted on a fixed pivot pin 220 and is baised clockwise, as viewed in FIG. 1 or 2, by a torsion spring 222. The latter reacts against a pin 201A in the housing 100 and bears against a bent-over portion 221b of the blocking lever 221. Thus, the ledge 221a holds the displacing lever 216 in the (first) position of FIG. 1 in which the surface bounding the shallower notch 216b is spaced apart from the projection 209c so that the strong torsion spring 218 cannot cause the tip of the scanning arm 209b to bear against the film 202 with an excessive force while the film is being moved forward in response to movement of the actuating member 125 toward the end position shown in FIG. 2. The blocking lever 221 dwells in the (first) position of FIG. 1 because the torsion spring 222 urges it against a fixed stop 223 of the housing 100. It is clear that the torsion spring 222 can be replaced by a spring (e.g., a helical spring) which pulls the blocking lever 221 against the stop 223.

Once the tip of the scanning arm 209b enters the oncoming perforation 202a (FIG. 2) and the surface 202b begins to pivot the feeler 209 clockwise, a protruding portion or lobe 209d of the feeler 209 engages the bent-over portion 221b and pivots the blocking lever 221 counterclockwise against the opposition of the torsion spring 222. As the feeler 209 pivots clockwise (in response to further leftward movement of the film 202 after the tip of the scanning arm 209b enters the perforation 202a), the projection 209c moves from register with the shallower recess 216b and into register with the deeper recess 216c of the displacing lever 216.

The ledge 221a of the blocking lever 221 becomes disengaged from the end portion 216a of the lever 216 (second position of the lever 221) when the transport of film 202 by the length of a frame is completed and when the projection 209c is located below the deeper notch 216c, as viewed in FIG. 2. The torsion spring 218 then rapidly pivots the displacing lever 216 counterclockwise so that the end portion 216a strikes against and pivots the control lever 211 clockwise to thus disengage the pallet 211a from the adjacent tooth 117a. This terminates the transport of film 202 by the length of a frame. At the same time, the control lever 211 stresses the spring 213 and the surface bounding the deeper notch 216c strikes against the projection 209c so that the bias of the spring 208b is assisted by the bias of the stronger spring 218. In other words, the springs 208b, 218 urge the tip of the scanning arm 209b against the backing paper 203. The arrangement may be such that the actuating member 125 can continue to move toward the right-hand end position of FIG. 2 after the displacing lever 216 has disengaged the control lever 211 from the gear 117, i.e., upon completion of film transport by the length of a frame.

As stated above, the scanning arm 209b can be retracted from the adjacent perforation 202a in response to actuation of the camera release 225 or in response to start of the next following transport of film 202 in a direction to the left, as viewed in FIG. 2. To this end, the housing 100 may contain a stationary withdrawing pin or post 227 which is engaged by a cam face 209e of the feeler 209 when the latter continues to pivot clockwise beyond the position shown in FIG. 2. The camera release 225 can also pivot the displacing lever 216 clockwise, as viewed in FIG. 2, so as to move the end portion 216a substantially upwardly and to thus allow the spring 213 to return the pallet 211a of the control lever 211 into engagement with the gear 117. This enables the operator to again advance the film 202 by the length of a frame in response to movement of the actuating member 125 from the end position of FIG. 1 toward the end position of FIG. 2.

The spring 208a is free to contract as soon as the tip of the scanning arm 209b is retracted from the adjacent perforation 202a. Therefore, the feeler 209 pivots counterclockwise, as viewed in FIG. 2, back to its first position and moves the projection 209c back into register with the shallower notch 216. Since the displacing lever 216 has been pivoted clockwise by the camera release 225, the torsion spring 222 is free to return the blocking lever 221 into engagement with the stop 223 whereby the ledge 221a returns into the path of movement of the end portion 216a and prevents the torsion spring 218 from causing the surface bounding the shallower notch 216b to bear against the projection 209c. The displacing lever 216 can be released to the action of the torsion spring 218 in response to completed cocking of the shutter (not shown) which takes place after the blocking lever 211 returns into engagement with the stop 223 so that the end portion 216a is intercepted by the ledge 221a and cannot strike against the control lever 211 and/or feeler 209.

The recess 110b of the wheel 110 registers with the camera release 225 only when the picture taking lens (not shown) is in full register with the foremost unexposed film frame. This insures that the release 225 cannot be actuated prior to completion of film transport by the full length of a frame.

An advantage of the improved photographic apparatus is that the feeler 209 is biased by the strong torsion spring 218 only upon completion of film transport by the length of a frame. Thus, the ledge 221a of the blocking lever 221 is disengaged from the end portion 216a of the displacing lever 216 only after the scanning arm 209b has penetrated into an oncoming perforation 202a under the action of the weak torsion spring 208b and after the feeler 209 has been pivoted by surface 202b from the first position of FIG. 1 to the second position of FIG. 2 against the opposition of the weak helical spring 208a. The spring 218 biases the feeler 209 only after the forward movement of roll film 202 is terminated or while the forward movement of the film is being terminated due to the fact that the end portion 216a disengages the pallet 211a from the adjacent teeth of the gear 117.

Another advantage of the improved photographic apparatus is that the forward transport of film 202 is terminated abruptly and at the exact moment when the foremost film frame is in exact register with the picture taking lens. The length of successively advanced film portions is always the same because the spring 208a invariably returns the feeler 209 to the same first position as soon as the scanning arm 209b is withdrawn from the adjacent perforation 202a by the pin or post 227 (such first position of the feeler 209 is determined by the length of the slot 209p in the lobe 209d for the bent-over end portion of the right-hand leg of the torsion spring 208b), because the distance between the end portion 216a of the displacing lever 216 and the right-hand arm of the control lever 211 (in the first position of the blocking lever 221) is always the same, and because the extent to which the lobe 209b must pivot the blocking lever 221 in order to disengage the ledge 221a from the end portion 216a is also the same. The identity of the lengths of successiviely transported film portions can be achieved even if the parts of the camera are not machineed with a high degree of precision. For example, the majority of parts shown in the drawing can be produced by stamping, punching or extrusion rather than by resorting to grinding, turning, milling or analogous time-consuming and expensive procedures.

The improved photographic apparatus is susceptible of many additional modifications. For example, the planetary transmission between the actuating member 125 and the takeup reel TR can be replaced by a much simpler gear train (not shown). In such apparatus, the control lever 211 is held out of engagement with one gear of the gear train by a spring while the film is being transported by the length of a frame, and the displacing lever 216 causes the control lever 211 to engage the adjacent gear of the gear train (and to thus terminate the transport of film) when the transport of film by the length of a frame is completed.

The displacing lever 216 can be pivoted directly by a portion of the shutter or by a member 224 (e.g., a pin) which is reciprocable with a slide, not shown, serving to open the shutter in response to actuation of the camera release 225. The direction in which the pin 224 must move to pivot the displacing lever 216 clockwise is indicated by an arrow 225A. While the shutter opens, the pin 224 moves in the direction indicated by arrow 225A and disengages the displacing lever 216 from the control lever 211 so that the pawl 211a can reengage the gear 117. The shutter is thereupon cocked (in response to movement of the actuating member 125) after the blocking lever 221 returns into engagement with the stop 223 so that the ledge 221a intercepts the end portion 216a and prevents the displacing lever 216 from striking against the control lever 211 and/or against the projection 209c of the feeler 209.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. In a photographic apparatus for use with photographic roll film having a row of perforations, one for each film frame, a combination comprising means for transporting the film lengthwise along a predetermined path; control means movable from a first position to a second position to thereby terminate the transport of film along said path; displacing means movable from a first to a second position to thereby move said control means to said second position; first means for biasing said displacing means to said second position thereof; blocking means movable from a first to a second position in which said blocking means respectively prevents and permits the movement of said displacing means from the first to the second position of said displacing means; a mobile feeler having a scanning portion in line with the row of perforations of the film in said path; and second means for biasing said scanning portion against the film in said path so that said scanning portion enters an oncoming perforation only under the action of said second biasing means during transport of the film in said path and the film moves said feeler from a first to a second position in response to further transport of the film along said path, said feeler having a second portion which moves said blocking means from said first to said second position not later than when said feeler reaches said second position thereof, said displacing means having a portion which bears against said feeler and urges said scanning portion into the adjacent perforation of the film in said path only in said second position of said displacing means whereby said scanning portion is urged into the adjacent perforation by said first as well as by said second biasing means.

2. A combination as defined in claim 1, further comprising means for biasing said blocking means to said first position thereof.

3. A combination as defined in claim 1, wherein said feeler is pivotable between said first and second positions thereof.

4. A combination as defined in claim 1, wherein at least one of said control means, said displacing means and said blocking means is a lever which is pivotable between said first and second positions thereof.

5. A combination as defined in claim 1, further comprising means for biasing said control means to said first position, and means for biasing said blocking means to said first position.

6. A combination as defined in claim 1, further comprising a shutter movable between open and closed positions and means for moving said displacing means back to said first position thereof in response to opening of the shutter.

7. A combination as defined in claim 1, further comprising means for withdrawing said scanning portion from the adjacent perforation of the film in said path and means for biasing said feeler back to said first position thereof so that said feeler is free to reassume said first position in response to withdrawal of said scanning portion from the adjacent perforation whereby said second portion of said feeler permits the movement of said blocking means from said second to said first position thereof.

8. A combination as defined in claim 7, further comprising means for biasing said blocking means to said first position.

9. In a photographic apparatus for use with photographic roll film having a row of perforations, one for each film frame, a combination comprising means for transporting the film lengthwise along a predetermined path; control means movable from a first position to a second position to thereby terminate the transport of film along said path; displacing means movable from a first to a second position to thereby move said control means to said second position; blocking means movable from a first to a second position in which said blocking means respectively prevents and permits the movement of said displacing means from the first to the second position of said displacing means; means for biasing said blocking means to said first position; a mobile feeler having a scanning portion in line with the row of perforations on the film in said path; means for biasing said scanning portion against the film in said path so that said scanning portion enters an oncoming perforation during transport of the film and the film moves said feeler. from a first to a second position in response to further transport of the film along said path, said feeler having a second portion which moves said blocking means from said first to said second position not later than when said feeler reaches said second position thereof; means for withdrawing said scanning portion from the adjacent perforation of the film in said path; means for biasing said feeler back to said first position thereof so that said feeler is free to reassume said first position in response to withdrawal of said scanning portion from the adjacent perforation whereby said second portion of said feeler permits the movement of said blocking means from said second to said first position thereof; and means for returning said displacing means to said first position not later than upon withdrawal of said scanning portion from the adjacent perforation of the film in said path.

* * * * *